United States Patent
Wei et al.

(10) Patent No.: US 6,757,184 B2
(45) Date of Patent: Jun. 29, 2004

(54) STEP-DOWN BUCK CONVERTER WITH FULL BRIDGE CIRCUIT

(75) Inventors: Jia Wei, Blacksburg, VA (US); Fred C. Lee, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 10/339,576

(22) Filed: Jan. 10, 2003

(65) Prior Publication Data

US 2004/0100805 A1 May 27, 2004

Related U.S. Application Data

(60) Provisional application No. 60/427,951, filed on Nov. 21, 2002.

(51) Int. Cl.[7] ................................................ H02M 3/24
(52) U.S. Cl. ......................... 363/71; 363/98; 363/80
(58) Field of Search ........................... 363/71, 98, 132, 363/17, 56.02, 80

(56) References Cited

U.S. PATENT DOCUMENTS 4,873,618 A * 10/1989 Fredrick et al. .............. 363/17
5,768,112 A * 6/1998 Barrett ........................ 363/16

* cited by examiner

Primary Examiner—Shawn Riley
(74) Attorney, Agent, or Firm—Whitham, Curtis & Christofferson, PC (57) ABSTRACT

A power converter with high efficiency, low component count, and high step down conversion capability. The converter has a full bridge circuit connected to a pair of buck output circuits. The full bridge circuit and buck circuits are not isolated. In one embodiment, a transformer is connected between the full bridge and buck circuits without providing isolation. In operation, the transformer is operated as an autotransformer, which results in reduced voltages and currents applied to the switches. As a result, the present invention is capable of reduced switching losses, lower output voltage and other benefits. The present invention also includes an embodiment having coupled inductors instead of a transformer. Also, the present invention includes embodiments having additional parallel buck output circuits for higher power and higher current capability.

12 Claims, 8 Drawing Sheets

STEP-DOWN BUCK CONVERTER WITH FULL BRIDGE CIRCUIT

CROSS-REFERENCE TO RELATED APPLICATIONS

The present application claims the benefit of priority from co-pending provisional patent application No. 60/427,951 filed on Nov. 21, 2002, and the complete contents of that application is herein incorporated by reference.

The present invention was developed with assistance from the US Government under a grant from the National Science Foundation (award number EEC-9731677 and Virginia Tech Grant No. 433604). The US Government may have certain rights in the invention.

FIELD OF THE INVENTION

The present invention relates generally to electrical power supplies. More particularly, it relates to a step-down power converter with a full bridge circuit connected without isolation to buck output circuits.

BACKGROUND OF THE INVENTION

Buck converters are commonly used in electronics for changing the voltage or polarity of a power supply. Buck converters typically employ two electronic switches (typically MOSFETs) in combination with an output inductor. The switches are alternately turned on, thereby providing current pulses to the output inductor.

Buck converters are often used to provide power to microprocessors, since they can convert standard 12 volt electrical power to the lower voltage needed. However, in recent years, the power requirements for microprocessors have begun to exceed the capabilities of conventional buck converters. Some microprocessors now in development, for example, will require 100 Amps at 1 volt, with less than 25 mV ripple. It is very difficult to produce this electrical current from the 12 volt power available, especially in combination with demanding efficiency and cost requirements. Conventional converters are expensive, inefficient, and require a large amount of circuit board space.

Figure 1:
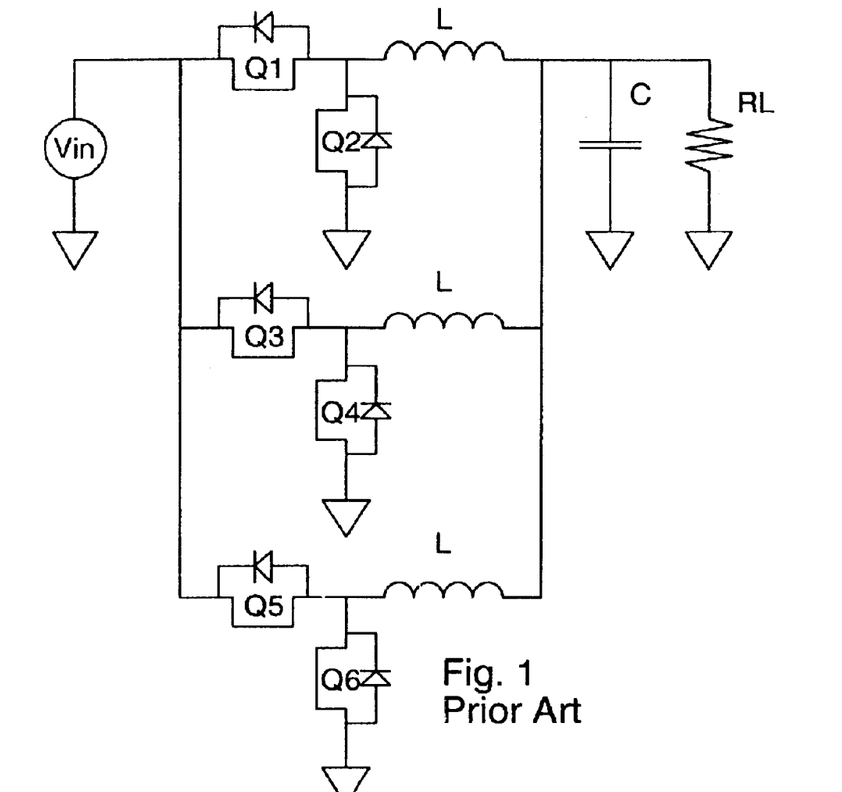
FIG. 1 (Prior Art) shows a conventional multi-phase buck converter according to the prior art.

FIG. 1 shows a multi-phase buck converter of the type commonly used in conventional microprocessor power supplies. The specific multi-phase buck converter of FIG. 1 includes three buck converter circuits connected in parallel, with each converter having two transistor switches (e.g. Q1 and Q2), and an output inductor L. The buck converters are operated in a phased relationship, so that the frequency of the output ripple at the load RL is a multiple of the frequency of each buck converter circuit. The circuit design of FIG. 1 presents several problems when attempts are made to increase output current, reduce output voltage, and reduce output voltage ripple. When solving these problems conventionally, more transistors are added to increase current capability, more buck converter stages are added, the capacitor C is increased in size, and operating frequency is increased. These changes tend to increase cost and circuit board space requirements, since more components are used. Efficiency is reduced because reverse recovery loss of the transistor body diodes is proportional to switching frequency. Also, turn-off loss is increased since it is proportional to both on-state current and operating frequency. Also, if a high voltage step-down ratio is required (e.g. step down from 12 volts to 1 volt), the necessary low duty cycle contributes to large switching losses and reduced efficiency.

With microprocessors having ever-more demanding power requirements (higher current, lower voltage, lower ripple), the conventional multi-phase buck converter approach is becoming impractical. There is an urgent need for voltage step-down power supplies that can provide well-regulated and high current power for advanced microprocessors. It would be particularly beneficial if such a power supply had reduced cost and reduced circuitboard space requirements, and had improved efficiency.

SUMMARY OF THE INVENTION

The present invention includes an electrical power step-down converter having a full bridge circuit, a transformer with primary and secondary windings, and a pair of buck output circuits. The transformer primary is connected across legs of the full bridge circuit. The transformer secondary is connected across legs of the full bridge circuit at point downstream from the full bridge (i.e. between the full bridge and buck output circuits). The full bridge circuit and buck output circuits are not isolated; they are directly connected.

In high power embodiments of the invention, the step-down converter can include an additional transformer and an additional pair of buck output circuits. The additional pair of buck output circuits are connected in parallel with the buck output circuits.

Preferably, the transformer has a 1:1 turns ratio. The transformer primary can have a capacitor connected in series to prevent saturation of a magnetic core of the transformer.

The present invention also includes a step-down converter having a full bridge circuit, a pair of primary inductors connected across the full bridge circuit, and a pair of buck output circuits connected to the full bridge circuit. Each buck output circuit has a secondary inductor coupled to one of the primary inductors. The buck output circuits are not isolated; they are directly connected to the full bridge circuit. Also, additional primary inductors and additional buck output circuits can be provided for higher power capability.

DETAILED DESCRIPTION OF THE PREFERRED EMBODIMENTS OF THE INVENTION

The present invention provides a new kind of non-isolated step-down power converter having a full bridge circuit in combination with buck output circuits. The full bridge circuit and the buck output circuits are directly connected. The device of the present invention has a transformer (operated as an autotransformer) or coupled inductors. The transformer or coupled inductors in the present invention allow increased duty cycle by decreasing the voltage and current that the buck circuit switches must handle. As a result, turn-off losses and reverse recovery losses are reduced, and operating frequency can be increased. Also, the capacitance of the output capacitor can be reduced. Additionally, the present power converter requires fewer components than a conventional multi-phase buck converter of similar power conversion capability.

Figure 2:
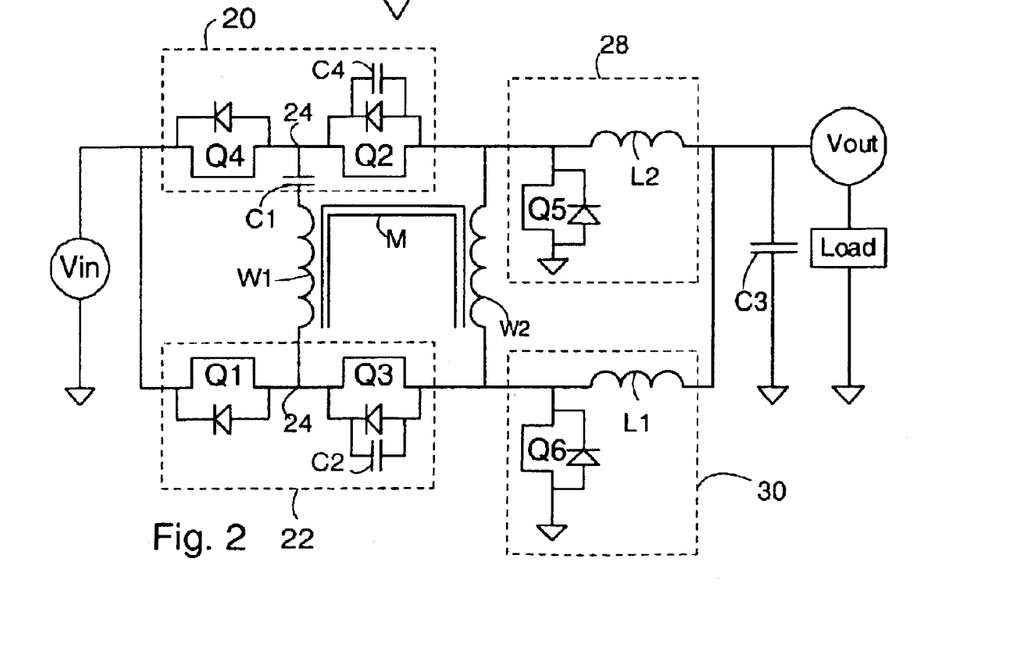
FIG. 2 shows a full bridge buck converter with transformer according to the present invention.

FIG. 2 shows a phase-shift buck converter according to the present invention. The circuit includes a full bridge circuit having a first leg 20 and a second leg 22. The first leg 20 comprises switches Q4 and Q2 connected in series (but does not include capacitor C1 or capacitor C4); second leg 22 comprises switches Q1 and Q3 connected in series (but does not include capacitor C2). A transformer primary winding W1 is connected between the first leg 20 and the second leg 22 at midpoints 24 of each leg (i.e. connected at point between Q4 and Q2, and at point between Q3 and Q1). A transformer secondary winding W2 is connected between the legs 20 22 at points downstream of the full bridge switches Q1, Q2, Q3, Q4. Primary winding W1 and secondary winding W2 are magnetically coupled through a magnetic core M. Switch Q5 and inductor L2 comprise a first buck output circuit 28; switch Q6 and inductor L1 comprise a second buck output circuit 30. Buck output circuits 28 30 comprise a pair of buck output circuits. Output capacitor C3 provides smoothing of voltage ripples provided to the load. Power source Vin provides voltage to be stepped down (e.g. 12 volts).

Capacitor C1 in series with the primary winding W1 is optional and serves to prevent saturation of the magnetic core M. Saturation of the core M can occur if the positive and negative currents passing through the windings W1 and W2 do not precisely cancel. Core saturation is undesirable as it can prevent proper functioning of the transformer W1 W2 and damage the circuit.

Soft-switching capacitors C2 and C4 are optional and are needed if the circuit is operated according to a soft switching scheme (also known as zero-voltage switching, or ZVS). Soft switching capacitors C2 C4 are not needed if the circuit is operated according to a hard switching scheme.

Switches Q1–Q6 can be field effect transistors (FETs) or other kinds of high-speed, low-on-resistance solid state switches known in the art. Diodes shown in parallel with switches Q1–Q6 are FET body diodes. Switches Q1–Q6 are controlled by a driving circuit that is not shown, but is also well known in the art.

The inductance values of L1 and L2 and capacitance value of capacitor C3 depend greatly on the maximum allowable ripple in the output voltage applied to the load. The inductance of L1 and L2, and the capacitance of C3 can be smaller in the present invention compared to prior art multi-phase buck converter circuits. This tends to substantially reduce the cost and size of the present circuit.

Figure 3:
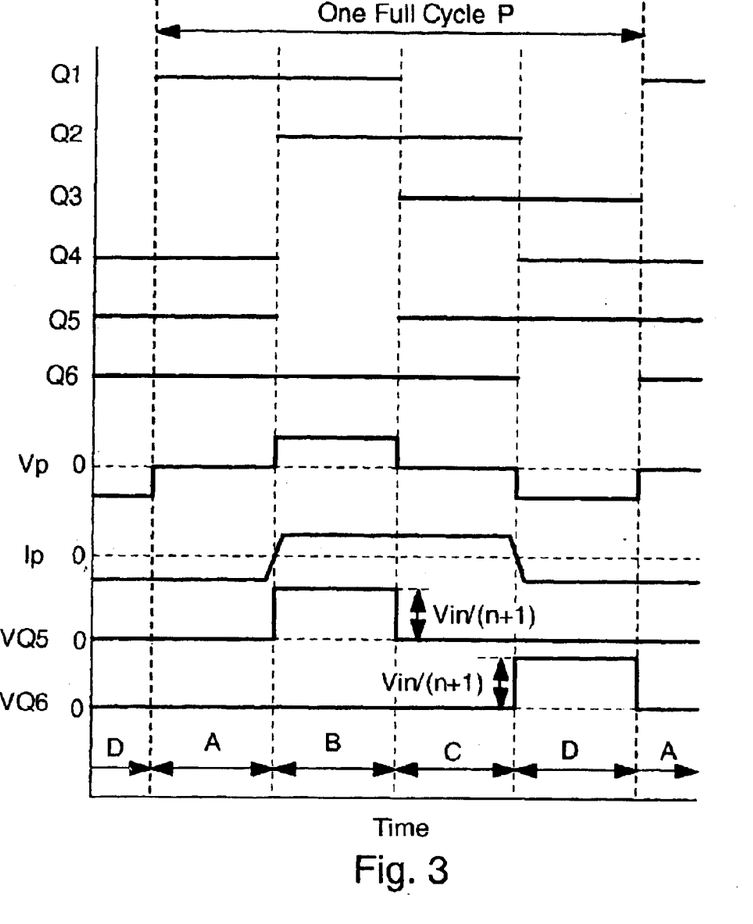
FIG. 3 shows a soft switching scheme and resultant circuit conditions for the transformer embodiment of FIG. 2.

FIG. 3 shows a soft switching scheme for controlling the circuit of FIG. 2. Black horizontal lines indicate when switches Q1–Q6 are ON. Vp is the voltage across primary winding W1. Ip is the current through primary winding W1. VQ5 is the voltage across switch Q5. VQ6 is the voltage across switch Q6.

Those skilled in the art will recognize the switching scheme of FIG. 3 as being identical to the switching scheme for a full bridge current doubler converter, which is well known in the art. However, the current flow and performance of the present invention are very different from a full bridge current doubler converter. This is because the present invention has a completely different topology (e.g. it is non-isolated), and therefore completely different patterns of current flow. A particular advantage of the present invention is that it allows the a soft switching scheme to be used in combination with buck output circuits. Conventional buck converters cannot be used with a soft switching scheme.

FIG. 3 shows slightly more than one full cycle of operation. The full cycle is divided into four periods: A, B, C, and D. Switch transitions occurring at the period transitions (indicated by vertical dotted lines) are separated by dead times, which are not illustrated, but are well known in the art. Specifically, dead times will typically be provided between Q1 and Q3 transitions, and between Q2 and Q4 transitions. During each period A–D, the circuit operates in a different mode. Periods A and C are freewheeling modes, when inductors L1 and L2, and the transformer W1 W2 are discharging and providing power output. Periods B and D are power transfer modes, when current flows from Vin, and the inductors L1 and L2 and transformer W1 W2 are charging.

The operation of the present full bridge buck converter of FIG. 2 is illustrated in detail in FIGS. 4a–4d, which show the circuit conditions during periods A–D, respectively. Arrows indicate the current flow directions.

Figure 4A:
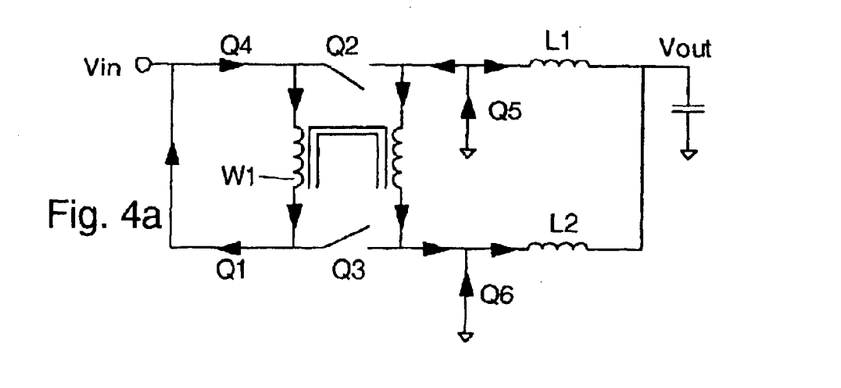
FIGS. 4a–4d illustrate the operation of the transformer embodiment according to a soft switching scheme.

FIG. 4a: Freewheeling mode. All the currents shown are freewheeling currents produced by inductors L1 L2 and transformer W1 W2, which were charged in a previous cycle.

Figure 4B:
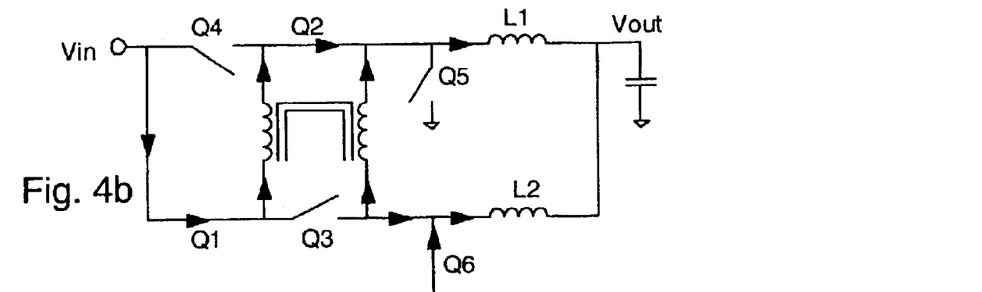

FIG. 4b: Power transfer mode. During period B, the primary winding W1 and secondary winding W2 are connected in series. Hence, the transformer W1 W2 is operated as an autotransformer during period B. Specifically, one end of winding W2 is connected to ground through switch Q6, and one end of winding W1 is connected to Vin through switch Q1. The voltage applied across switch Q5 (in OFF state) is equal to Vin/(n+1), where n is the turns ratio of the transformer W1 W2. Hence, for a 1:1 turns ratio (a particularly useful embodiment), the voltage applied across Q5 is ½ of Vin. This is significant because it results in a reduced body-diode reverse recovery loss compared to prior art buck regulators that apply the full Vin voltage. It is also noted that Q4 experiences reduced voltage (i.e. Q4 experiences the complement of the voltage applied across Q5, or, equivalently, Vin−[Vin/(n+1)]), which reduces switching loss. This is helpful when the circuit loses soft-switching capability under light load conditions. Operation of transformer W1 W2 as an autotransformer during period B therefore provides important benefits in the invention.

Figure 4C:
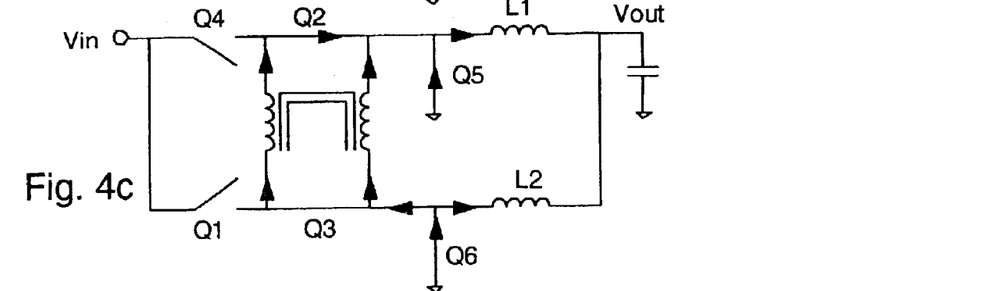

FIG. 4c: Freewheeling mode. Current in secondary winding W2 reverses, and output current is provided by the inductors L1 and L2, and the transformer W1 W2.

Figure 4D:
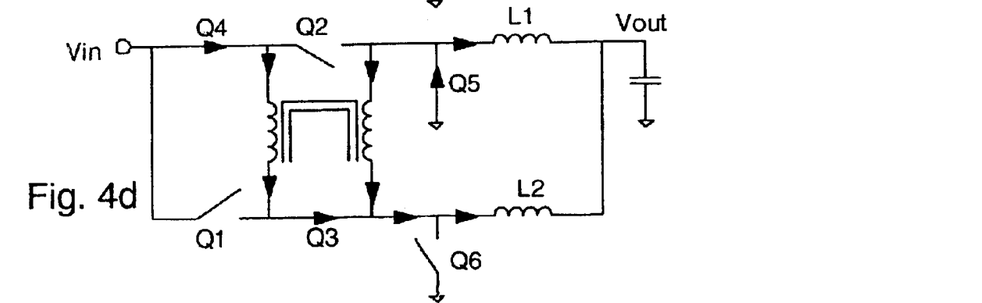

FIG. 4d: Power transfer mode. In this mode, the transformer W1 W2 again is operated as an autotransformer, with the primary and secondary winding connected in series. The voltage across Q6 is Vin/(n+1), and the voltage across Q1 is Vin−[Vin/(n+1)]. Hence, the advantages of reduced body-diode reverse recovery loss are also provided in association with period D.

After period D, the cycle repeats. It is noted that switching losses are minimized due to the soft switching scheme of FIG. 3.

The out put voltage $V_{out}$ of the circuit of FIG. 2 is given by $$V_{out} = \frac{\frac{1}{2}DV_{in}}{(n+1)},$$

where D is the system duty cycle (i.e. duty cycle for the full bridge circuit including Q1–Q4) and n is the turns ratio between windings W1 and W2. The system duty cycle is defined as $$D = \frac{T_B + T_D}{P},$$

where $T_B$ and $T_D$ are the durations of power transfer modes B and D, respectively, and P is the duration of one full cycle (illustrated in FIG. 3). The system duty cycle D can be varied widely (e.g. between 0 and 1) by proper electronic control of the switches Q1–Q4, but will typically be about 50%. According to the above equation, a 50% system duty cycle combined with a 1:1 turns ratio will provide about a 8:1 step-down voltage conversion. In the present invention, the operation of the transformer as an autotransformer (having 1:1 turns ratio) provides the significant benefit of an additional voltage reduction factor of ½. This allows efficient power conversion (e.g. 90%) in combination with high voltage conversion ratios (e.g. about 10:1).

Each individual switch Q1–Q6 also has an associated duty cycle, termed the switch duty cycle. If soft switching is used, then the switch duty cycle for each of Q1–Q4 must be 50%. The switch duty cycle for each of Q5 and Q6 can be varied in the range of 0–1, and this will tend to adjust the output voltage Vo. However, it is noted that the switch duty cycle for Q5 and Q6 will typically be in the range of 0.5–1. For best performance, the switch duty cycle for Q5 should be complementary to the power transfer mode B, and the switch duty cycle for Q6 should be complementary to the power transfer mode D.

Figure 5:
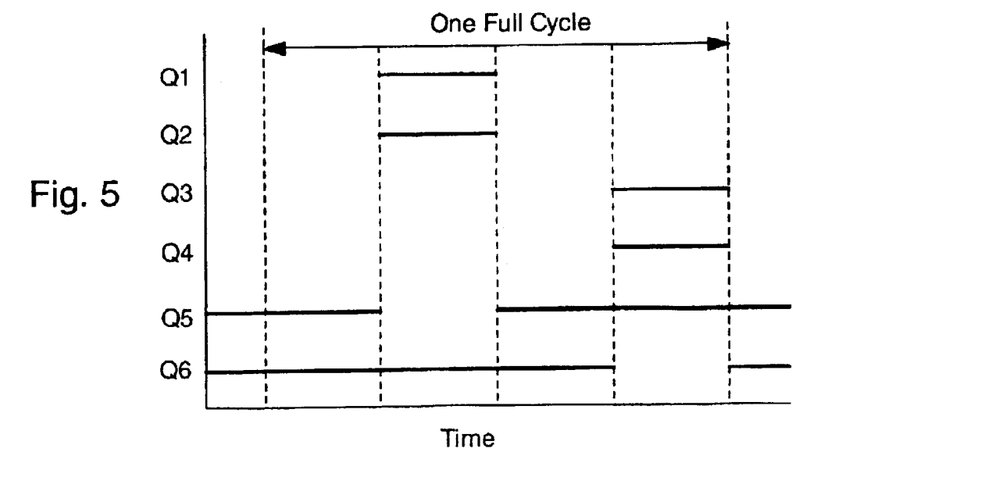
FIG. 5 shows a hard switching scheme that can be used in the present invention.

It is noted that the circuit of FIG. 2 can be operated using a "hard" switching scheme. A hard switching scheme that can be used with the device of FIG. 2 is shown in FIG. 5. The hard switching scheme of FIG. 5 is identical to hard switching schemes commonly used to operate full bridge current doubler power converters. The hard switching scheme of FIG. 5 provides reduced voltage of Vin/(n+1) across the switches Q5 and Q6 during the power transfer modes (now shown), as in the soft switching embodiment. Also, it is noted that the voltage across Q1 and Q4 is less than Vin during the power transfer modes. In this way, the hard switching scheme also provides the advantages of the present invention, which include increased voltage-step-down capability, and reduced switching losses.

The system duty cycle in the hard switching embodiment can be widely varied (e.g. between 0–1) by electronic control, but will typically be about 50%. The switch duty cycle for Q1 and Q2 will necessarily be the same, since they are operated synchronously in the hard switching embodiment. Similarly, the switch duty cycle or Q3 and Q4 will be the same, since they are also operated synchronously in the hard switching embodiment.

Figure 6:
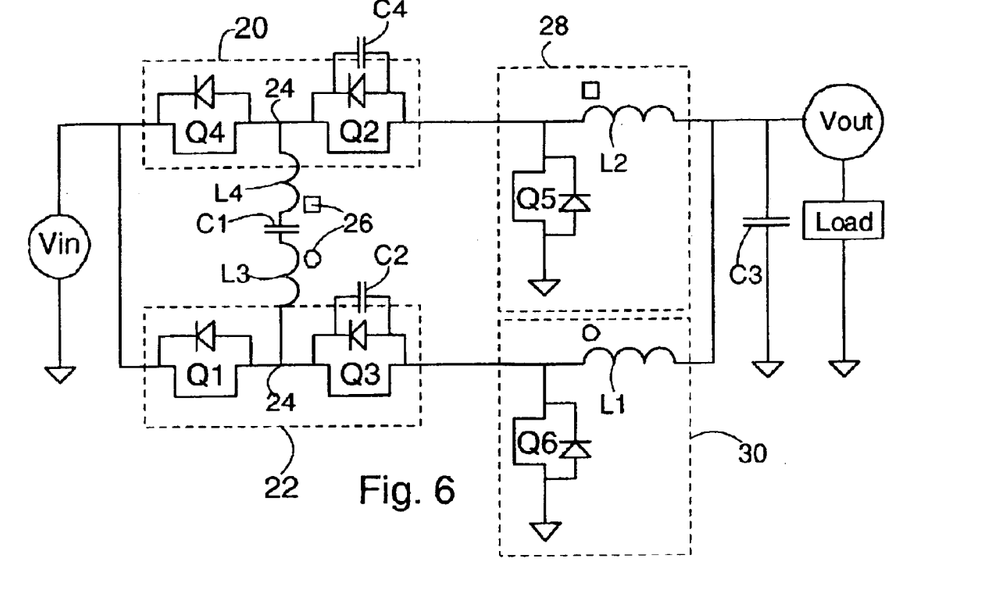
FIG. 6 shows an embodiment of the invention having coupled inductors.

FIG. 6 shows a second embodiment of the present invention having coupled inductors instead of the transformer W1 W2. The circuit of FIG. 6 includes primary inductors L3 and L4 connected in series across the first leg 20 and second leg 22 of the full bridge circuit. The primary inductors L3 and L4 are connected at midpoints 24 of the legs 20 22. In this aspect of the invention, primary inductor L3 is magnetically coupled to secondary inductor L1, and primary inductor L4 is magnetically coupled to secondary inductor L2. The magnetic coupling is provided by magnetic cores (e.g. ferrite) which are not shown. Small circles and squares 26 indicate the polarity of the coupling between inductors L2–L4, and between inductors L1–L3. Secondary inductors L1 L2 comprise part of the buck output circuits 30 28, respectively. Coupled inductors L1–L3 and coupled inductors L2–L4 must have the same turns ratio. The turns ratio can have a wide range of values (e.g. 1:10 to 10:1), but is preferably 1:1.

The converter circuit of FIG. 6 can be operated according to exactly the same soft or hard switching schemes as the circuit of FIG. 2 (i.e. according to the switching schemes illustrated in FIG. 3 or FIG. 5). The circuit of FIG. 6 provides many of the same advantages as the circuit of FIG. 2, such as reduced switching losses due to reduced voltage across switches during the power transfer modes.

Capacitors C1, C2, and C4 perform the same functions in the circuit of FIG. 6 as in the circuit of FIG. 2. C1 is optional, and C2 and C4 are needed only if soft switching is used.

In operation, the coupled-inductor circuit of FIG. 6 has different current flows and energy flows than the circuit of FIG. 2, even though the switch control may be exactly the same. Specifically, it is noted that the waveforms for Vp, Ip, VQ5 and VQ6 may be different in the coupled inductor embodiment of FIG. 6. Current and energy flows are different due to replacement of the transformer W1 W2 by the coupled inductors L1–L3 and L2–L4. FIGS. 7a–7d show circuit conditions during periods A, B, C, and D, respectively, when the coupled inductor circuit of FIG. 6 is operated according to the soft switching scheme illustrated in FIG. 3.

Figure 7A:
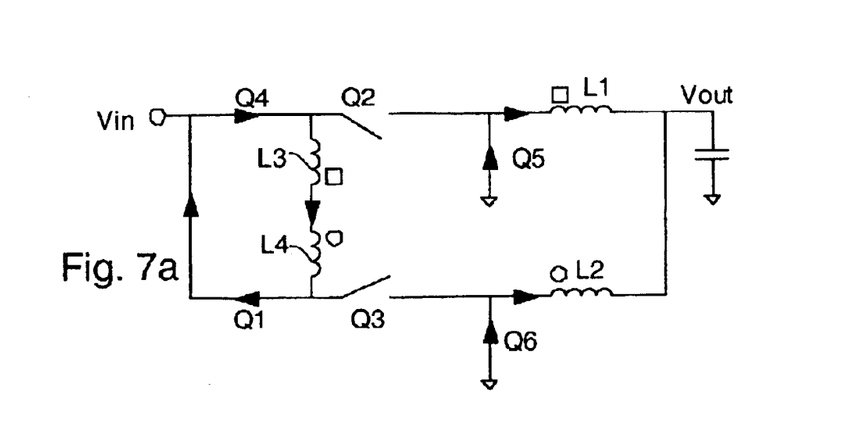
FIGS. 7a–7d illustrate the operation of the coupled inductor embodiment according to the soft switching scheme.

FIG. 7a: Freewheeling mode. L1 and L2 provide output current. Freewheeling current flowing through L3 and L4 couples energy to L1 and L2 to aid in providing output current.

Figure 7B:
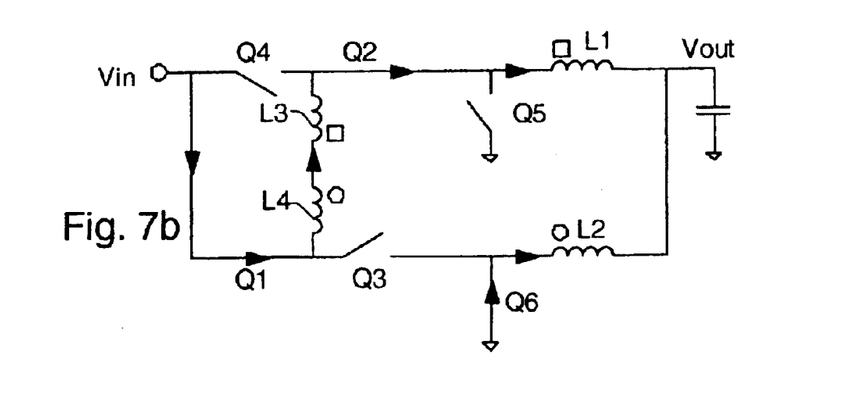

FIG. 7b: Power transfer mode. Inductors L3 and L4 are charged, and energy is coupled directly from L3 and L4 to L1 and L2, respectively. In this power transfer mode, L3 and L1 behave similarly to an autotransformer. L4 acts as a voltage source since it is coupled to L2, which is freewheeling.

Figure 7C:
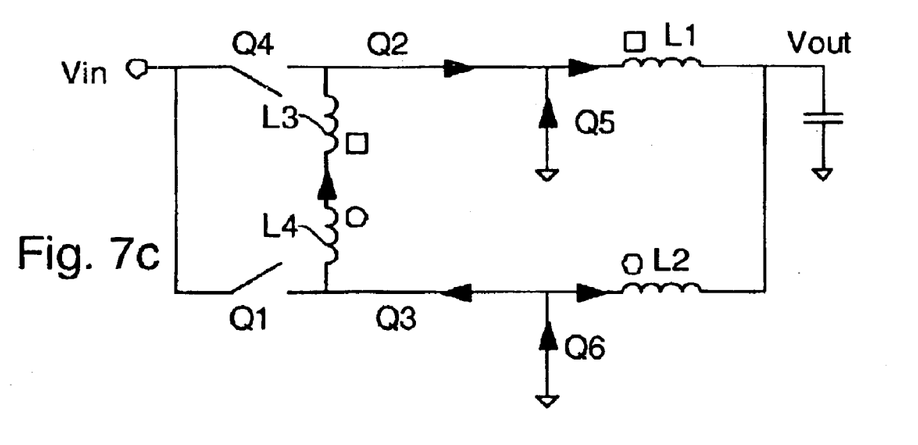

FIG. 7c: Freewheeling mode. L1 and L2 are freewheeling and provide the output current. L3 and L4 are also freewheeling and provide output current to L1.

Figure 7D:
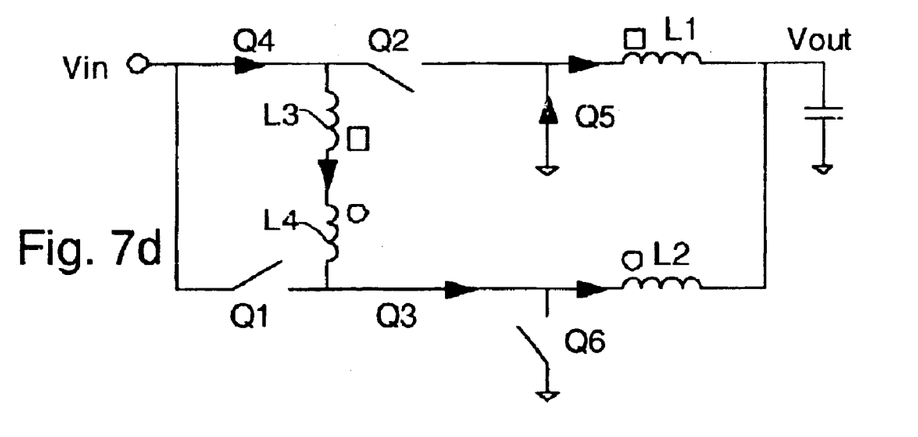

FIG. 7d : Power transfer mode. Inductors L3 and L4 are charged, and energy is coupled directly from L3 and L4 to L1 and L2, respectively. L4 and L2 behave similarly to an autotransformer. L3 acts as a voltage source since it is coupled to L1, which is freewheeling.

The output voltage $V_{out}$ of the coupled inductor circuit if FIG. 6 is given by $$V_{out} = \frac{\frac{1}{2}DV_{in}}{(n+1)},$$

where n is the turns ratio of each coupled inductor. The turns ratio n is necessarily the same for both coupled inductors. D is the system duty cycle (defined as above), and can be widely varied. If soft switching is used, the switch duty cycle of each switch Q1–Q4 must be 50%, which is the same as in the transformer embodiment of FIG. 2. It is also noted that the coupled inductor circuit of FIG. 6 can be operated according to a hard switching scheme. If hard switching is used, then Q1 and Q2 must have the same switch duty cycle, and Q3 and Q4 must have the same switch duty cycle. These requirements are known in the art of hard switching schemes for voltage converters.

Figure 8:
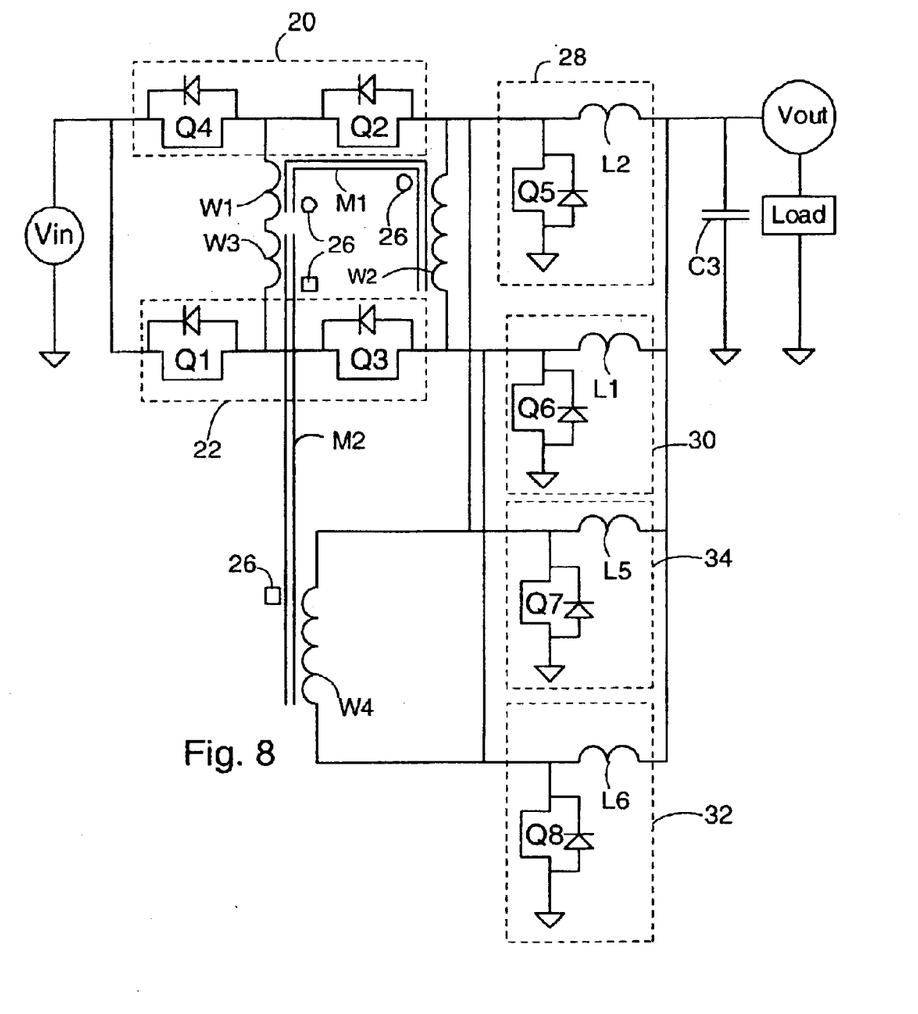
FIG. 8 shows an embodiment of the invention having an additional transformer and an additional pair of buck output circuits.

FIG. 8 shows an alternative embodiment of the invention (of the transformer type) having an additional transformer, W3 W4 and an additional pair of buck output circuits 32 34. The additional buck output circuits 32 34 are connected in parallel with the buck output circuits 28 30, respectively. The additional transformer W3 W4 includes primary winding W3 and secondary winding W4, which are magnetically coupled through magnetic core M2. Primary winding W3 is connected in series with primary winding W1 between midpoints of the legs 20 22 of the full bridge circuit. Secondary winding W4 is connected in parallel with secondary winding W2.

Small circles and squares 26 indicate the coupling polarity of all the transformer windings W1–W4. For clarity, capacitors C1, C2, and C4 have been omitted from the circuit of FIG. 8, but they may be included to provide the functionality described above.

The additional transformer W3 W4 and additional buck output circuits 32 34 provide increased current and power capability. That is, since the number of buck output circuits is doubled (compared to FIG. 2), more current can be provided with less ripple, even with no increase in operating frequency. The circuit of FIG. 8 can be operated with a soft-switching scheme (e.g. as shown in FIG. 3) or a hard switching scheme (e.g. as shown in FIG. 5). In soft switching or hard switching, switch Q7 of the additional buck output circuits is operated exactly the same as switch Q5. Switch Q8 of the additional buck output circuits is operated exactly the same as switch Q6.

The circuit of FIG. 8 can be modified to have further additional pairs of (e.g. 5th and 6th) buck output circuits. In this case, a third transformer is provided, and a primary winding of the third transformer is connected in series with W1 and W3. A secondary winding of the third transformer is connected in parallel with W2 and W4. Also in this case, the 5th and 6th buck output circuits are connected in parallel with the buck circuits 28 30 32 34. Any number of additional transformers and additional pairs of buck output circuits can be employed.

Embodiments of the invention with additional pairs of buck output circuits (e.g. the device of FIG. 8) provide the benefit of increased current and increased power capability. Additionally, since the full bridge circuit (comprising Q1–Q4) drives all the buck output circuits, component count and circuitboard space requirements are minimized. It is noted that switches Q1–Q4 may need to have higher power and current handling capability for driving additional pairs of buck output circuits.

Figure 9:
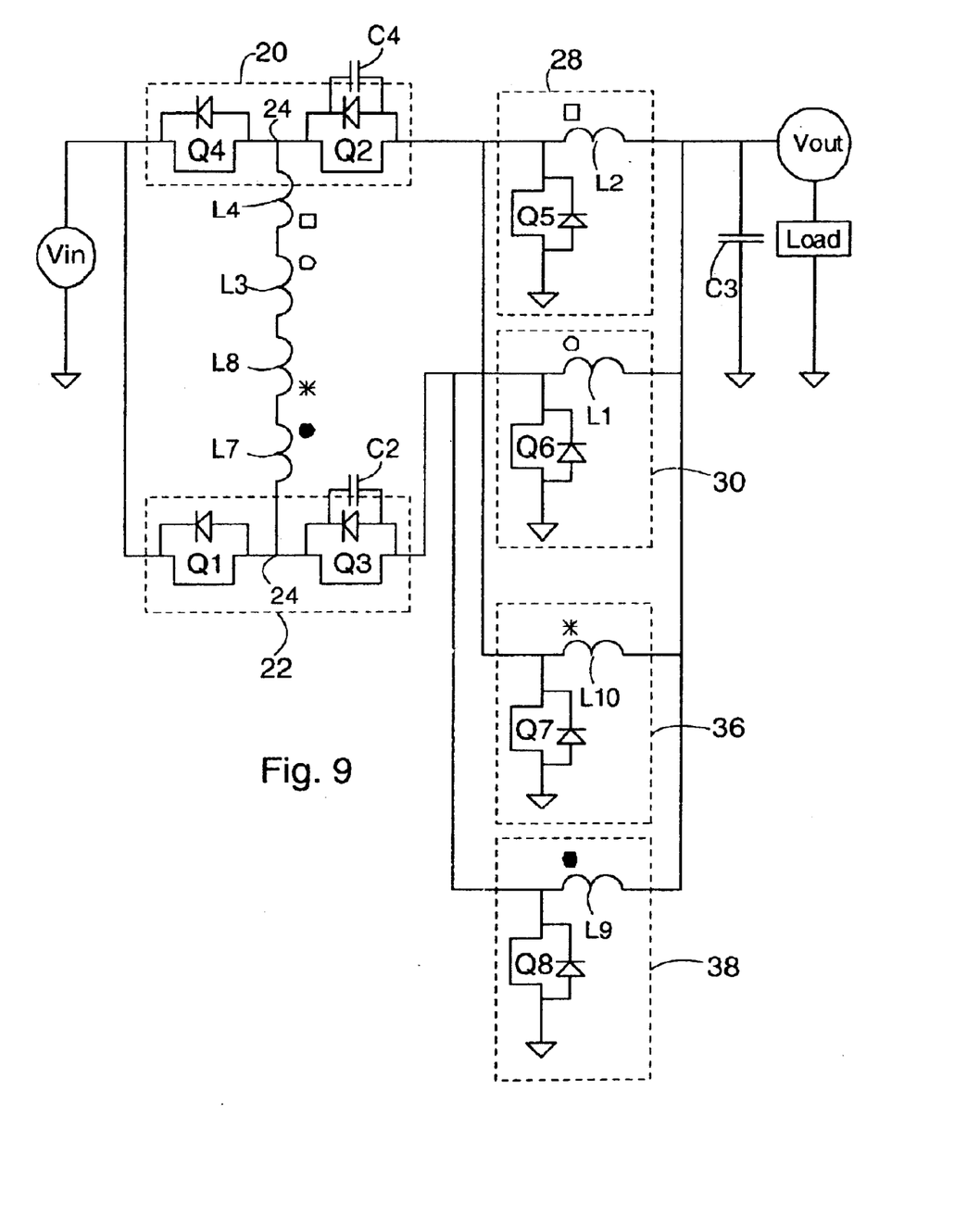
FIG. 9 shows an embodiment of the invention having additional primary inductors and an additional pair of buck output circuits with secondary inductors magnetically coupled to the primary inductors.

FIG. 9. shows yet another embodiment of the invention (of the coupled inductor type) having additional coupled inductors and additional buck output circuits driven by the full bridge. Specifically, the circuit has additional primary inductors L7 and L8 which are connected in series with primary inductors L3 and L4. Primary inductors L7 and L8 are magnetically coupled to secondary inductors L9 and L10, respectively, with the polarity as indicated. The circuit of FIG. 9 also has an additional pair of buck output circuits 36 38, which are connected in parallel with buck output circuits 28 30, respectively. The additional pair of buck output circuits 36 38 are coupled to the primary inductors L7 and L8. In operation, Q7 is switched according to exactly the same pattern as Q5, and switch Q8 is switched according to exactly the same pattern as Q6. It is noted that further additional buck output circuits can be connected in parallel with buck output circuits 28 30 36 and 38. Switches in the further additional buck output circuits are controlled in exactly the same pattern as Q5 and Q6. Capacitors C2 and C4 are needed only if a soft switching scheme is employed.

The embodiment of FIG. 9 provides increased current and power capability compared to the circuit of FIG. 6, since additional buck output circuits are provided. The circuit of FIG. 9 can be used with hard switching or soft switching.

Figure 10:
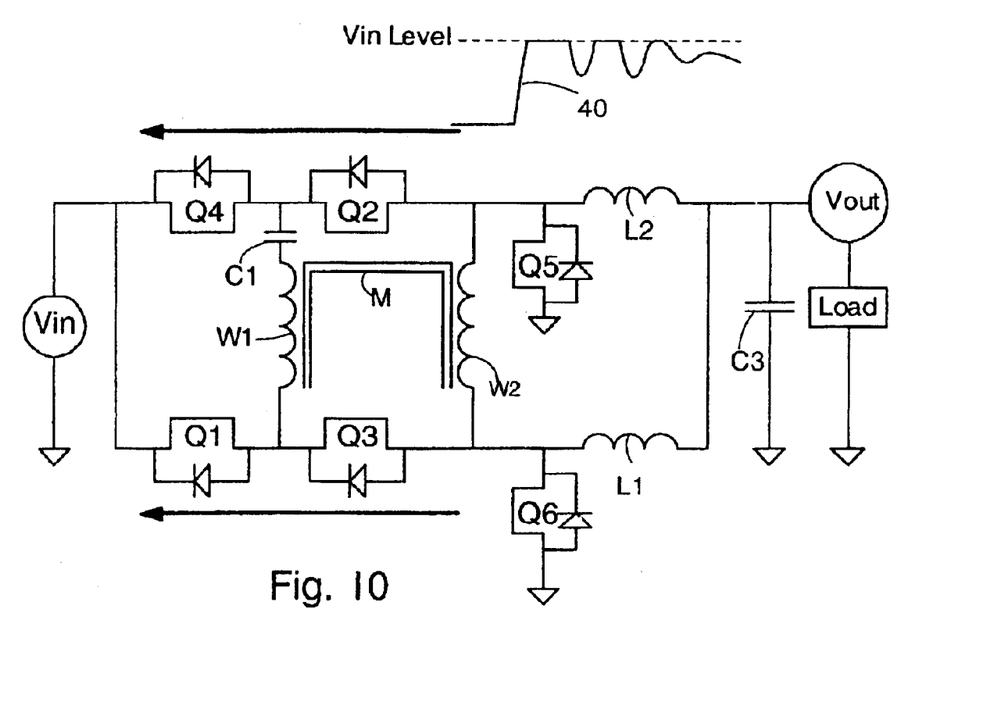
FIG. 10 illustrates how the present invention provides clamping for secondary side ringing and high voltage transients.

FIG. 10 illustrates a beneficial effect of the present invention in which secondary side ringing is clamped. In some power converters, switch transitions on the secondary side (e.g. analogous to transitions in switches Q5 and Q6) can cause very high voltage spikes and oscillations that can be difficult to suppress or damaging to other circuit components. In the present invention, such ringing is automatically clamped to approximately the input voltage Vin. This is because large transients 40 that exceed Vin are conducted through body diodes of switches Q1–Q4 and then absorbed by the power supply providing Vin. This helps the present circuits provide quiet, well-regulated and reliable electrical power.

In the present invention, the transformers, inductors and coupled inductors can be fabricated from integrated magnetic components, wherein magnetic cores (e.g. ferrite) are coupled to wire patterns on printed circuit boards. Techniques for making integrated magnetic transformers, coupled inductors and inductors are well known in the art.

While the invention has been described in terms of its preferred embodiments, the invention can be practiced with modification within the scope of the appended claims.

We claim:

1. An electrical power step-down converter, comprising:
   a) a full bridge circuit comprising two parallel legs with each leg having two electrical switches in series;
   b) a first transformer with a primary winding connected between the legs at midpoints, and with a secondary winding connected between the two legs downstream from the switches; and
   c) a first pair of buck output circuits, with each buck circuit of the pair connected to each leg of the full bridge circuit.

2. The electrical power step-down converter of claim 1 further comprising at least one additional transformer and at least one additional pair of buck output circuits, wherein:
   a) the additional transformer has a primary winding connected in series with the primary winding of the first transformer;
   b) the additional transformer has a secondary winding connected in parallel with the secondary winding of the first transformer;
   c) the additional pair of buck output circuits is connected in parallel with the first pair of buck output circuits.

3. The electrical power step-down converter of claim 1 wherein the first transformer has a 1:1 turns ratio.

4. The electrical power step-down converter of claim 1 further including a driver for operation according to a soft switching scheme.

5. The electrical power step-down converter of claim 1 further comprising a capacitor connected in series with the primary winding to prevent saturation of a magnetic core of the transformer.

6. An electrical power step-down converter, comprising:
   a) a full bridge circuit comprising two parallel legs with each leg having two electrical switches in series;
   b) a first pair of primary inductors connected in series between the legs at midpoints; and
   c) a first pair of buck output circuits, with each buck circuit of the pair connected to each leg of the full bridge circuit, wherein each buck circuit includes a secondary inductor magnetically coupled to one primary inductor.

7. The electrical power step-down converter of claim 6 further comprising at least one additional pair of primary inductors and at least one additional pair of buck output circuits, wherein:
   a) the additional pair of primary inductors are connected in series to each other, and are connected in series with the first pair of primary inductors;
   b) each buck output circuit of the additional pair includes a secondary inductor magnetically coupled to one of the additional primary inductors;
   c) the additional pair of buck output circuits is connected in parallel with the first pair of buck output circuits.

8. The electrical power step-down converter of claim 6 wherein the primary inductors and the coupled secondary inductors have a turns ratio of 1:1.

9. The electrical power step-down converter of claim 6 further comprising a capacitor connected in series with the first pair of primary inductors to prevent saturation of a magnetic core coupled with one of the primary inductors.

10. An electrical power step-down converter comprising:
   a) a full bridge circuit comprising two parallel legs, with each leg having two electrical switches in series;
   b) a buck output circuit connected directly to each leg without isolation; and
   c) an inductive device connected between the legs at midpoints.

11. The converter of claim 10 wherein the inductive device is a transformer primary winding, and the inductive device is magnetically coupled to a transformer secondary winding connected between the legs downstream from the switches.

12. The converter of claim 10 wherein the inductive device includes two primary inductors, wherein each buck output circuit includes a secondary inductor, and the primary inductors are magnetically coupled to the secondary inductors.

* * * * *